United States Patent [19]
Dougherty

[11] Patent Number: 5,929,663
[45] Date of Patent: Jul. 27, 1999

[54] CONTROL CIRCUIT FOR DISTRIBUTED ELECTRICAL EQUIPMENT

[75] Inventor: John J. Dougherty, Collegeville, Pa.

[73] Assignee: General Electric Company, Schenectady, N.Y.

[21] Appl. No.: 08/909,694

[22] Filed: Aug. 12, 1997

[51] Int. Cl.⁶ .................................................. H03C 3/00
[52] U.S. Cl. ........................ 327/101; 327/104; 363/126; 363/127
[58] Field of Search ................................... 327/100, 101, 327/104; 363/126, 127; 323/902; 331/145, 149, 150

[56] References Cited

U.S. PATENT DOCUMENTS

| | | | |
|---|---|---|---|
| 4,459,653 | 7/1984 | Smith | 363/131 |
| 4,590,444 | 5/1986 | Wilcox | 331/111 |
| 4,658,345 | 4/1987 | Ingman | 363/126 |
| 4,752,865 | 6/1988 | Hatakeyama et al. | 363/126 |
| 4,801,887 | 1/1989 | Wegener | 363/126 |
| 5,119,285 | 6/1992 | Liu et al. | 363/127 |

*Primary Examiner*—Timothy P. Callahan
*Assistant Examiner*—An T. Luu
*Attorney, Agent, or Firm*—Thomas M. Blasey; Carl B. Horton

[57] ABSTRACT

A control circuit for distributed electrical equipment includes a relaxation oscillator configured for voltage to frequency conversion whereby the output frequency is proportional to the input voltage signal. An opto-coupler provides voltage isolation to the circuit and a standard 8-bit counter translates the frequency signals to a low voltage count data.

16 Claims, 2 Drawing Sheets

CONTROL CIRCUIT FOR DISTRIBUTED ELECTRICAL EQUIPMENT

BACKGROUND OF THE INVENTION

Electric distribution equipment are often protected by fast response circuit interruption devices such as circuit breakers and contactors as controlled by protective relays such as described within U.S. patent application Docket No. 11RC-4923 entitled "A Hybrid Protective Relay Having Enhanced Contact Response Time" filed concurrently herewith.

Control signals to the relays are provided by means of communications buses such as described within U.S. patent application Ser. No. 08/628,533 filed Apr. 3, 1996 entitled "Dynamic Data Exchange Server Simulator".

Oftentimes the control signals are provided to the protective relays over standard current-carrying conductors that connect between the electric equipment and the relays. In this application, voltage signals are sent to the relays at different voltage levels depending upon the type of electric equipment involved. It is not uncommon to have operating voltages ranging from 48–250 volts, for example.

Prior input circuits employ high voltage type power transistors to insure that the transistors are voltage-rated to withstand the higher voltage signals. To handle a wide operating range, the circuits are made very sensitive. Leakage currents on open, high voltage circuits can cause false indications of the presence of an input signal.

The use of analog type voltage comparators improves the circuit response over a wide range of signal voltages. However, to provide programmable levels, individual, isolated reference voltage adjustments would be needed.

It would be desirable to provide programmable response to voltage signals over a range from low to high values without requiring a number of high voltage transistors, or manual adjustment of the input signals via a potentiometer or like device.

One purpose of the invention, accordingly, is to provide a simple electronic circuit for providing input to protective relays over a wide range of operating voltages by transferring the input voltage signals to proportionate frequency signals at a fixed voltage value and transferring the signals to a processor by means of a conventional 8-bit counter.

SUMMARY OF THE INVENTION

A control circuit for distributed electrical equipment includes a relaxation oscillator configured for voltage to frequency conversion whereby the output frequency is proportional to the input voltage signal. An opto-coupler provides voltage isolation to the circuit and a standard 8-bit counter translates the frequency signals to a low voltage count data that is inputted to the processor associated with the electrical equipment.

DESCRIPTION OF THE PREFERRED EMBODIMENT

Before describing the input control circuit of the invention, it is helpful to review the state-of-the-art circuits known to provide similar control function in association with similar electrical control equipment.

Figure 1:
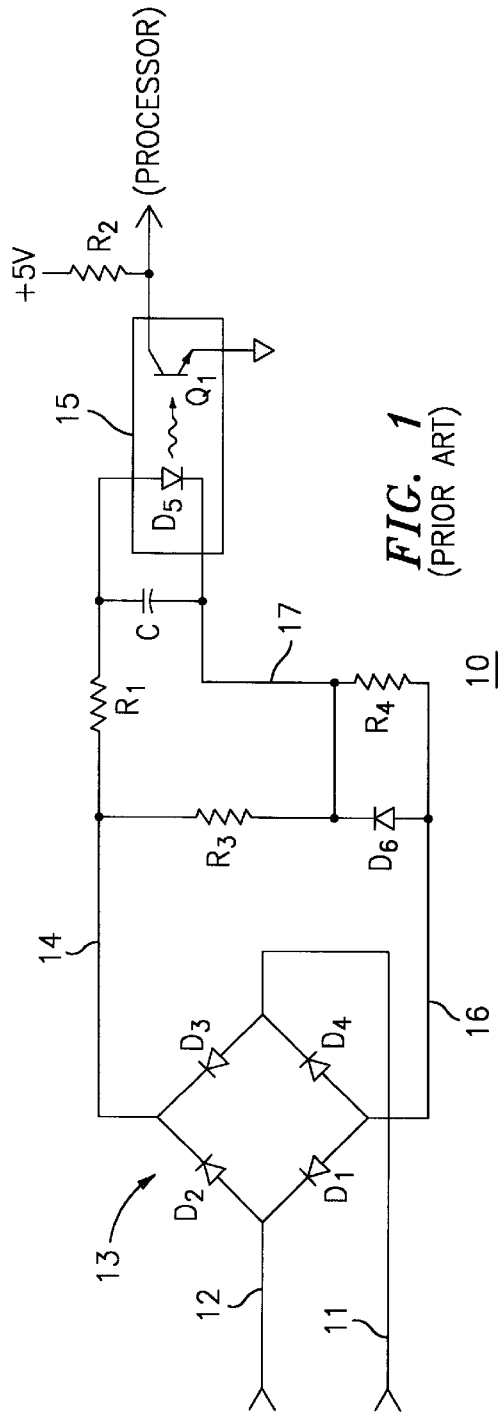
FIG. 1 is a circuit diagram of an input control circuit according to the Prior Art.

An input circuit 10 as now used for turning off associated electrical control equipment is shown in FIG. 1 and includes input conductors 11, 12 adapted for receiving an input AC or DC control voltage from either a remote operator or from current sensing apparatus. The voltage is inverted to DC by means of the bridge rectifier 13 that includes rectifying diodes D1–D4 and is placed onto conductor 14 for processing through current limiting resistors R1, R3 to the cathode of the photodiode D5 within the opto-coupler-isolator 15 and the base of the FET 17. The capacitor C protects the opto-coupler-isolator from overvoltage conditions. The conductor 16 connects with the gate of the FET 17 through photodiode D6 and to the cathode of the FET through resistor R4. Upon receipt of a voltage signal upon conductors 14, 16, the photodiode D5 turns on to turn on the photo transistor Q1 and provide a control signal from resistor R2 to a remote processor associated with the electrical control equipment to actuate the equipment.

Figure 2:
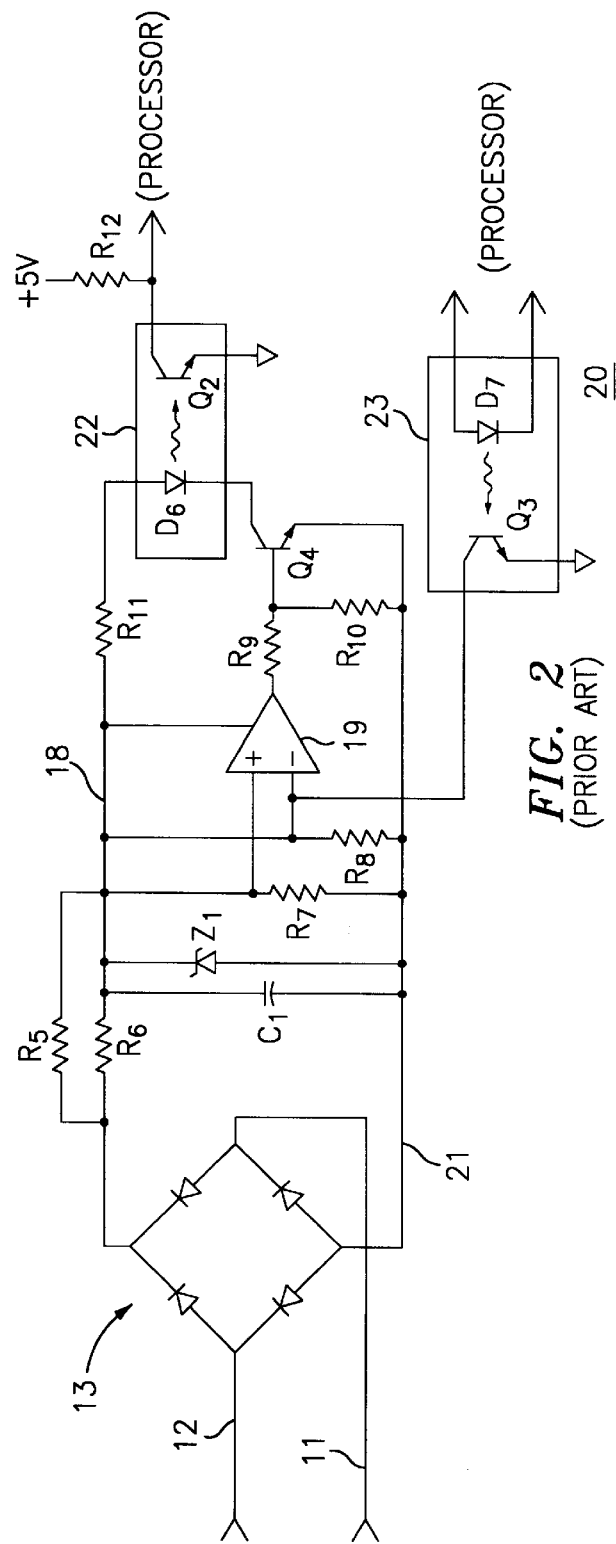
FIG. 2 is a circuit diagram of a further input circuit in accordance with the Prior Art.

A further known input circuit 20 shown in FIG. 2 receives an input control voltage over similar input conductors 11, 12 and bridge rectifier 13. The positive voltage signal then proceeds over conductor 18 and current limiting resistors R6, R11 to the cathode of the photodiode D6 within the opto-coupler 22. The positive voltage signal is applied via current limiting resistor R5 to the positive input to the comparator 19, to the second input of the comparator through current limiting resistor R6 and to the negative conductor 21 through the voltage divider resistor R7. Capacitor C1, varistor Z1 and resistor R8 protect the circuit from over voltage pulses that may occur. A reference voltage from the processor associated with the electrical equipment is applied to the negative input to the comparator through opto-coupler 23 containing the photodiode D7 and photo transistor Q3. When the voltage applied to the positive input to the comparator reaches the reference value, the comparator provides an output voltage through the voltage divider resistors R9, R10 to the base of a switching transistor Q4, which is emitter-connected with the anode of the opto-coupler 22. The cathode of the switching transistor Q4 is connected with the negative conductor 21 to complete the circuit to the circuit. It is noted that each associated piece of electrical equipment will require a separate opto-coupler and comparator. When the photodiode D6 within the opto-coupler 22 turns on, a control signal is supplied to the processor via resistor R12 and photo transistor Q2.

Figure 3:
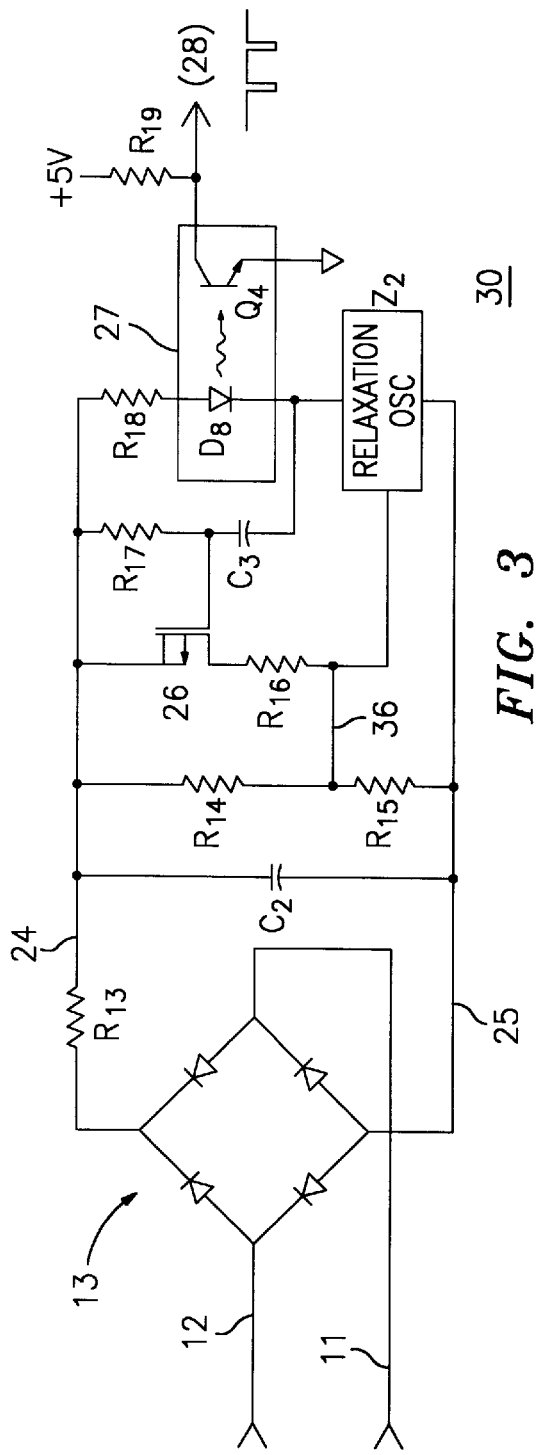
FIG. 3 is a circuit diagram of an input control circuit according to the invention.

In accordance with the invention, a novel input circuit 30 is depicted in FIG. 3 and operates to provide the same control function as the Prior Art circuits 10 and 20 shown earlier in FIGS. 1 and 2. The input circuit receives an input control voltage over similar input conductors 11, 12 and bridge rectifier 13. A current limiting resistor R13 protects the circuit components from overcurrent and conditions and produces a first predetermined voltage across capacitor C2 that connects between the positive and negative conductors 24, 25 and is sized to provide sufficient voltage drop across the voltage dividing resistors R14, R15 to turn on a National Semiconductor type TL431 bandgap regulator IC depicted at Z2 that is configured to operate as a relaxation oscillator. A good example of one such relaxation oscillator is found in U.S. Pat. No. 4,590,444 entitled "Voltage Controlled RC Oscillator Circuit". Current then passes from the connection between R14, R15 to FET 26 through the hysterisis resistor R16 causing the FET to become conductive. The current then transfers across by-pass conductor 36 to the reference input of the IC latching the IC in the ON condition and discharging capacitor C3 through discharge resistors R17, R18 to turn on the photodiode D8. Switching transistor Q4 then delivers an output voltage across resistor R19 at a pulse rate, as indicated, to a standard 8-bit counter 28 of FIG. 4 having a frequency that varies in proportion to the input voltage on input conductors 11 and 12. When capacitor C2 becomes charged to a second voltage determined by the selected values of the voltage dividing resistor R14–R16, the IC stops conducting, the FET turns off. The IC remains non-conductive until C2 again charges to the first predetermined voltage upon receipt of a further input voltage.

Figure 4:
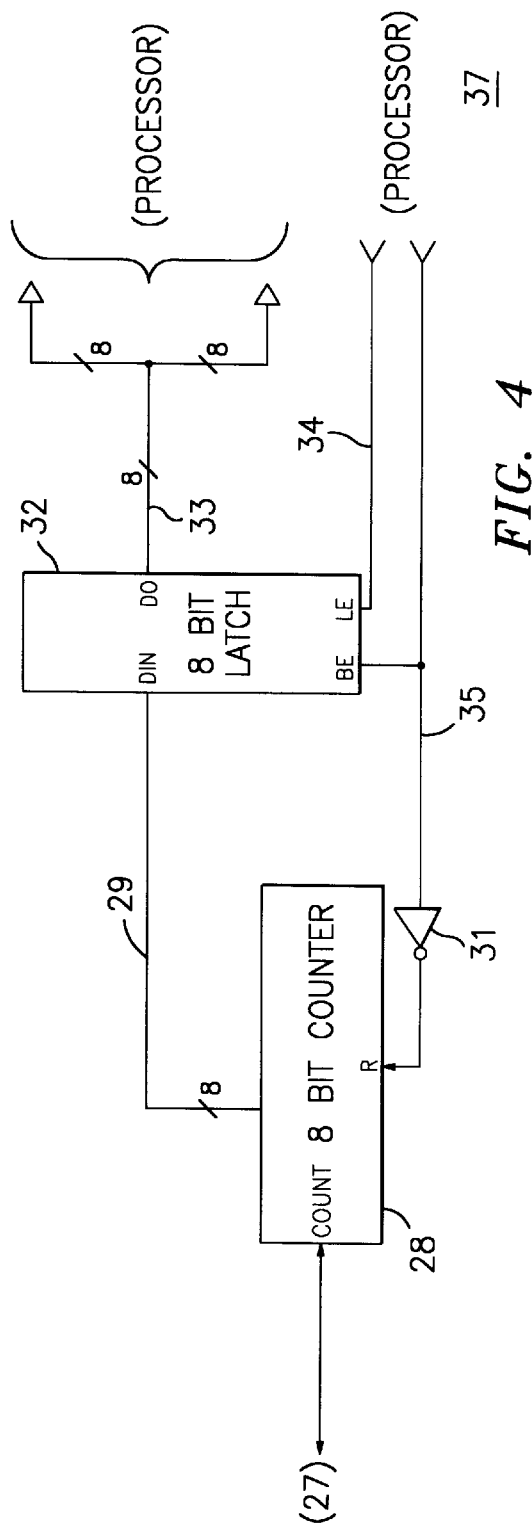
FIG. 4 is a circuit diagram of an output control circuit used with the input control circuit of FIG. 3.

The output circuit 37 that provides the control signal to the processor (not shown) associated with the designated electrical equipment, is depicted in FIG. 4. The 8-bit counter 28 receives the output control signal generated by the opto-coupler 27 of FIG. 3 and outputs a count over an 8-bit data bus 29 to an 8-bit latch 32 which inputs the count to the processor over a separate 8-bit data bus 33. The 8-bit latch 32 receives a latch signal from the processor over latch conductor 34 and outputs a count to the processor over the 8-bit data bus 33. The processor reads the count and resets the counter at fixed time intervals via a conductor 35 that connects with the counter through an inverter 31. In accordance with the program stored within the processor, the fixed period is shorter than the time to overflow the counter at the highest input voltage received by the input circuit 30 of FIG. 3. By comparing the read count against a threshold value, the presence or absence of the input voltage is accordingly determined at a settable level. The processor could be replaced by suitable Field Programmable Gate Array (not shown) if a hardware implementation of the count and read function is desired.

It has thus been shown that a single voltage input and control circuit using one FET and opto-coupler circuit in combination with a simple relaxation oscillator circuit can be employed to control a plurality of associated electrical equipment without requiring multiple FET's, comparators and opto-couplers as now required within such input voltage circuits according to the Prior Art.

What is claimed is:

1. An input control circuit for use with distributed electrical equipment comprising:

means for receiving an input voltage and converting said input voltage to a DC voltage;

a capacitor receiving said DC voltage and discharging said DC voltage at a first predetermined capacitor voltage;

a semiconductor switch connected between said capacitor and a relaxation oscillator, said relaxation oscillator thereby outputting a frequency pulse in proportion to said received input voltage; and output circuit means arranged for providing said frequency pulse to an output circuit.

2. The input control circuit of claim 1 including a voltage divider connected in parallel with said capacitor, the voltage divider including at least one resistor in parallel with said semiconductor switch.

3. The input control circuit of claim 2 wherein said output circuit means includes an opto-coupler.

4. The input control circuit of claim 3 wherein said input voltage receiving means includes a bridge rectifier.

5. The input control circuit of claim 1 wherein said semiconductor switch comprises a FET.

6. The input control circuit of claim 4 wherein said relaxation oscillator includes a band gap regulator IC.

7. The input control circuit of claim 1 wherein said output circuit includes a digital counter arranged for connection with a digital latch and a remote processor.

8. The input control circuit of claim 7 wherein said digital counter comprises an 8-bit counter.

9. The input control circuit of claim 7 wherein said digital latch comprises an 8-bit latch.

10. The input control circuit of claim 8 wherein said 8-bit counter is reset at fixed time intervals by a remote processor.

11. The input control circuit of claim 6 wherein said capacitor turns off said semiconductor switch and said relaxation oscillator at a second predetermined capacitor voltage lower than said first predetermined capacitor voltage.

12. The input control circuit of claim 6 wherein an input to said band gap regulator IC connects with said bridge rectifier and an output from said band gap regulator IC connects with said opto-coupler.

13. The control circuit of claim 11 wherein a gate to said band gap regulator IC connects with said voltage divider.

14. The input control circuit of claim 13 wherein said voltage divider comprises a first and second resistor connected in series and a third resistor, said third resistor being connected in parallel with said first resistor.

15. The input control circuit of claim 14 wherein said first and third resistor are connected with a reference input to said band gap regulator IC.

16. The input control circuit of claim 1, wherein the relaxation oscillator inclueds a zener diode.

* * * * *